Oct. 25, 1960 L. F. CIANCIOLO ET AL 2,957,198
MACHINE FOR CUTTING POULTRY AND THE LIKE
Filed Aug. 25, 1958 5 Sheets-Sheet 2

Inventors:
Lawrence F. Cianciolo,
Peter C. Cianciolo,
by Robert K. Randall,
Attorney Oct. 25, 1960    L. F. CIANCIOLO ET AL    2,957,198
MACHINE FOR CUTTING POULTRY AND THE LIKE Filed Aug. 25, 1958    5 Sheets-Sheet 3

Inventors:
Lawrence F. Cianciolo,
Peter C. Cianciolo,
by Robert K. Randall
Attorney Inventors:
Lawrence F. Cianciolo,
Peter C. Cianciolo,
by Robert K. Randall.
Attorney Oct. 25, 1960  L. F. CIANCIOLO ET AL  2,957,198
MACHINE FOR CUTTING POULTRY AND THE LIKE
Filed Aug. 25, 1958  5 Sheets-Sheet 5

Inventors:
Lawrence F. Cianciolo,
Peter C. Cianciolo,
by Robert K. Randall,
Attorney United States Patent Office 2,957,198
Patented Oct. 25, 1960

2,957,198

MACHINE FOR CUTTING POULTRY AND THE LIKE

Lawrence F. Cianciolo, Arlington, and Peter C. Cianciolo, Lexington, Mass., assignors to Merchants Poultry Co., Boston, Mass., a partnership Filed Aug. 25, 1958, Ser. No. 756,839

6 Claims. (Cl. 17—11)

This invention relates to a method of and machines for splitting and fabricating, or cutting up, the carcasses of edible animals, particularly chickens, including fowls, broilers, and fryers, as well as turkeys and the like, for hotels, caterers, and institutions, in order to make available prepared cuts providing uniform servings.

It is an object of the invention to provide an improved method of splitting and fabricating a dressed and drawn chicken or the like preparatory to cooking the same.

It is also an object of this invention to provide an improved machine for splitting and cutting up butchered poultry or the like which will be of simple and comparatively inexpensive construction and by means of which splitting and dividing operations can be expeditiously and efficiently carried out in the commercial preparation of these carcasses for sale in cut-up form.

The invention method contemplates starting with the butchered carcass which has been incised at both ends thereof and the crop and viscera removed through said incisions, and thereafter utilizing the incisions and the visceral cavity to slide the carcass telescopically upon and along a guide comprising a rigidly supported carcass-supporting spit or arm formed with a longitudinal slot that is occupied by the marginal portion of a circular saw rotor by which the carcass is split longitudinally and medially from end to end as the carcass is slid longitudinally on the guide.

The invention further contemplates a method and apparatus for quickly and easily cutting up the carcass into breasts, either single or double, or into leg quarters, with or without removal of the backbone.

Other objects of the invention and the manner of their attainment are hereinafter pointed out.

In the accompanying drawings:

Fig. 7 is a side view of the machine of Fig. 6, certain parts being shown as broken away.

Figure 1:
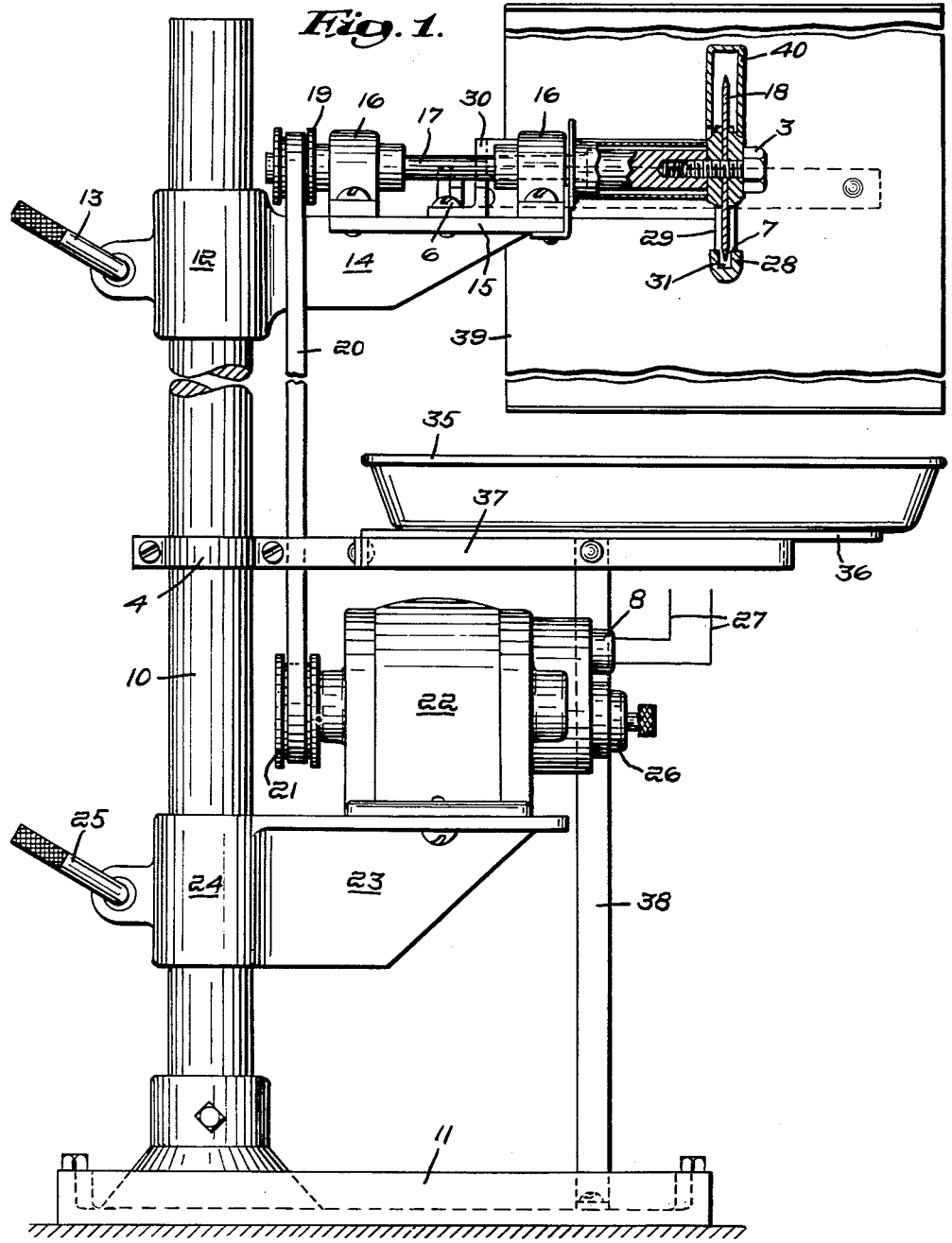
Fig. 1 is a front elevation, partly in section, of a carcass-splitting machine constructed in accordance with this invention.
Figure 2:
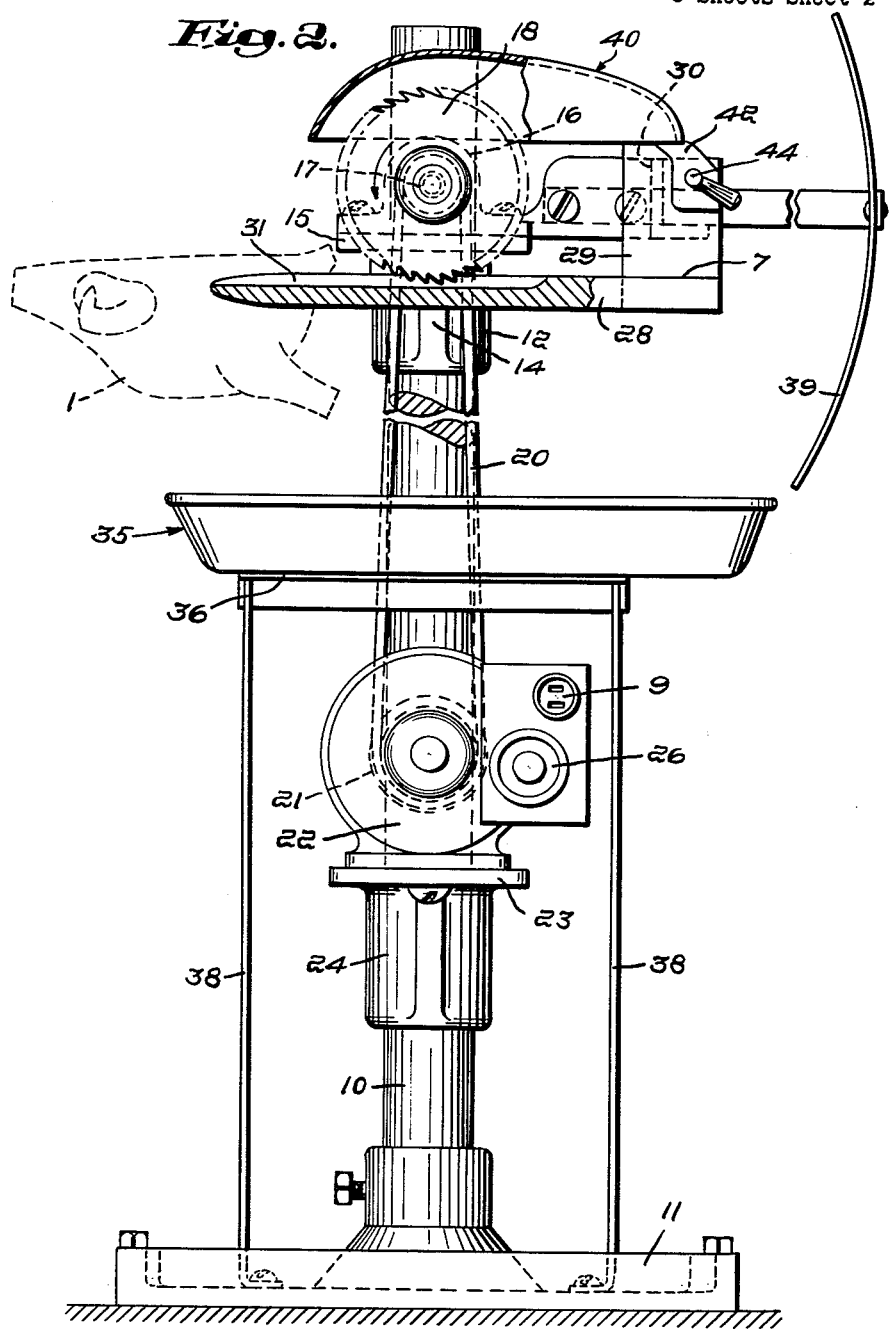
Fig. 2 is a side elevation, partly in section, of the machine shown in Fig. 1 as viewed from the right-hand side.

The carcass-splitting and halving machine illustrated in Figs. 1 to 5 comprises a pedestal made up of an upright standard or column 10 provided at its lower end with a base 11 to seat upon a floor to which it may be fastened by screws as shown. Upon the upper end portion of the column 10 is mounted a bracket having a vertically adjustable split collar 12 that is normally fixedly clamped to column 10 by a clamping screw 13. The radially projecting arm 14 of this bracket is provided at the top of its free end portion with a shelf 15. Fixed in positions upon the top of this shelf are two spaced-apart bearings 16, 16, which rotatably support a horizontal shaft 17 that is radially disposed relatively to the column 10. Fixedly mounted upon the outer end of shaft 17 by a cap screw 3 is a circular saw 18.

At its inner end the shaft 17 carries a pulley 19 connected by a belt 20 with a pulley 21 fast on the armature shaft of an electric motor 22. This motor is secured in position upon the top of a bracket arm 23 extending radially from a split collar 24 that is mounted upon the column 10. Collar 24 is normally fixed in position upon column 10 by a clamp screw 25 but when this screw is loosened collar 24 and motor 22 may be adjusted vertically as may be required to maintain belt 20 tight.

The motor 22 and a switch 26 mounted thereon are supplied with electric current by a socket 9 and plug 8 via wires 27, the switch providing means through which the operator of the machine may start and stop the motor.

Figure 3:
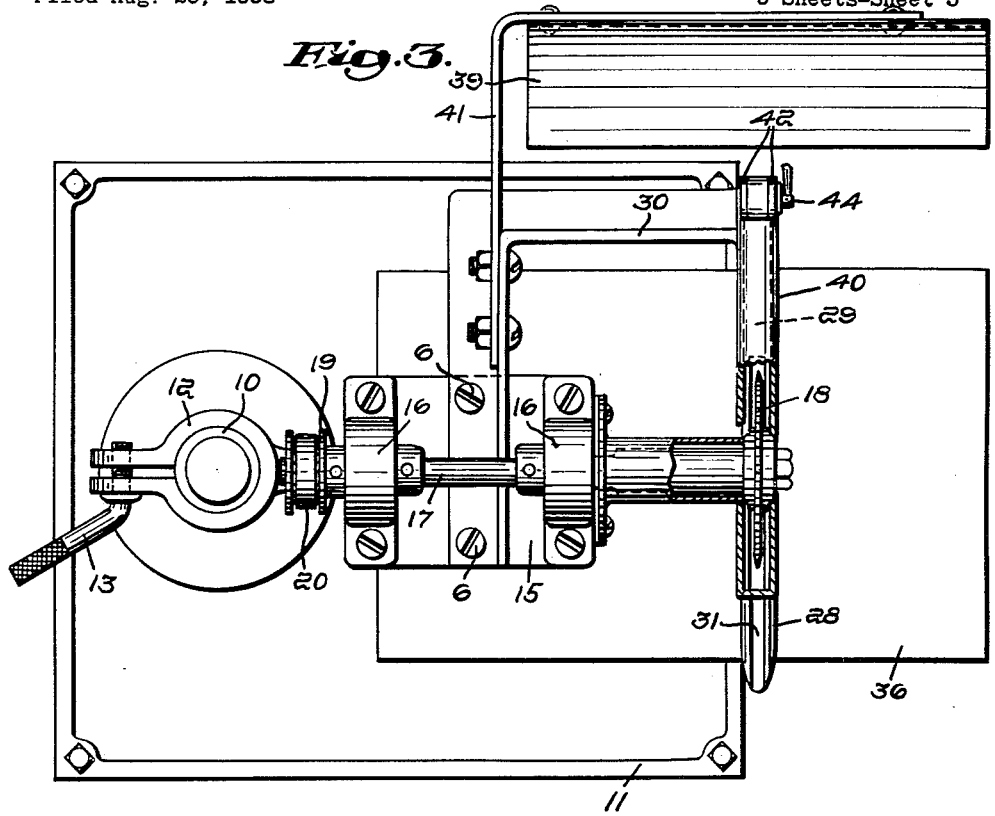
Fig. 3 is a top plan view of the machine shown in Figs. 1 and 2, certain parts being broken away.
Figure 4:
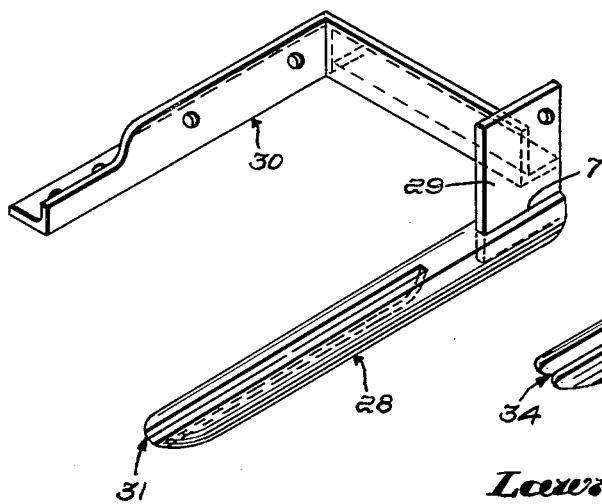
Fig. 4 is a perspective view of one form of spit-like carcass-supporting arm.

Directly below the circular saw 18 and with its axis tangent to saw 18 is a horizontally disposed elongated spit-like guide arm 28 which has its free front end pointed as shown and its opposite end split and welded at 7, Fig. 4, to the lower end of a thin flat vertical plate 29 which, in turn, is welded across one end of a right-angular bracket 30 of the angle section that is fastened by screws 6 through its horizontal web at its opposite end upon the top of the shelf 15 as shown in Figs. 1 and 3. The plate 29 is disposed edgewise relatively to the saw and in the same vertical plane therewith.

The lowermost marginal portion of the saw 18 occupies a position within a vertical longitudinal medial slot 31 formed in guide arm 28 so that the portions of the arm at opposite sides of the slot engage the inside of the abdominal cavity and support the flesh of the fowl 1 or the like being slid along arm 28 and operated upon by the saw.

As noted, the fowl or the like is incised adjacent to the rear vent and also at its breast end adjacent to the crop, and through the openings thus produced are removed the crop and all of the viscera. The rear incision is then presented to the pointed end of the guide arm 28 whereupon the fowl or the like is slid endwise on to the latter and past the saw 18; this is accomplished while the operator holds the carcass by the two legs. If the carcass is presented to the saw with its back uppermost then the saw splits the bird completely through the backbone medially from end to end thereof. To divide the carcass lengthwise into two separate halves it is again slid along the guide arm 28 but with the breast uppermost. To further divide a half-carcass into two or more parts it is only necessary to place the half-carcass crosswise on the guide arm and slide the half-carcass toward and past the saw. This is also the way an entire bird is cut crosswise to provide double-breast portions, the rear half then being split to form leg quarters.

Figure 5:
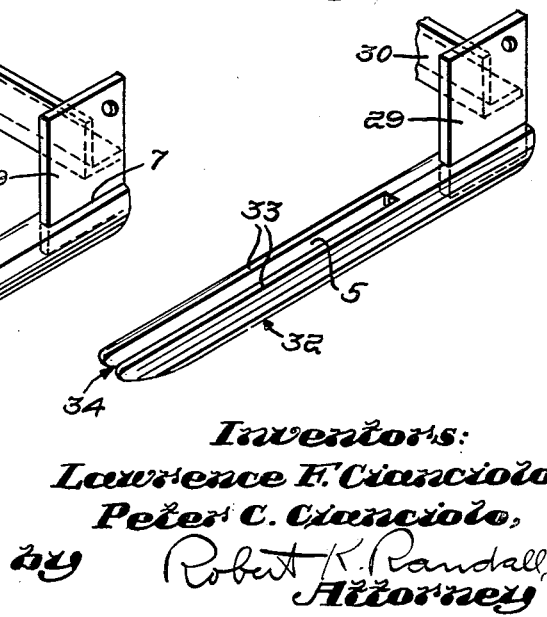
Fig. 5 shows an alternative form of carcass-supporting arm.

In Fig. 5 there is shown a modified form of guide arm 32 made up of two metal strips 33 fitted together side by side whose rear ends are recessed upon their inner sides to receive between them the lower end of the metal plate 29 to which they are welded. The free end portions of the strips 33 are recessed at 5 upon their inner sides to provide the arm with a medial slot 34 to be occupied by the saw 28.

While it is impaled upon the guide arm the carcass occupies a position above a pan 35 by which particles of the carcass that are removed by the saw 18 and thrown downwardly therefrom are caught and collected. This pan is removably seated upon a pan-supporting shelf 36 that is part of a horizontal frame 37 rigidly attached at 4 at its one end to column 10, the outer end portion of said arm being supported by struts 38 by which it is connected with the base 11.

The U-section guard 40 houses the upper third of saw 18, being in the form of a hood straddling the saw with ample clearance above and on each side, shielding the saw from above and at each side, as shown in Fig. 1, and preventing the throwing of meat fragments upward and forward. Extensions 42 on the rear end of the guard embrace the plate 29 and are clamped thereto by screw 44. Thus the saw is guarded at top and bottom, and is made practically inaccessible from behind.

Back of the saw 18 and spaced somewhat away therefrom there is provided an arcuate shield plate 39 to intercept particles of flesh and bone that are thrown rearwardly by the saw. This shield 39 is rigidly secured to one of the arms of an angular bracket 41 whose other arm is fixedly bolted, as shown in Fig. 3, to the angular bracket 30 by which the guide arm 28 is supported.

The split collar 12 and the parts carried thereby are made vertically adjustable on the column 10 in order to accommodate operators of different heights.

By disposing the plate 29 edgewise relatively to the saw and with the two disposed in the same vertical plane, the sides of the carcass bordering the slit made therein by the saw can be spread apart to avoid engagement with the plate 29 as the carcass is moved past the latter.

Figure 10:
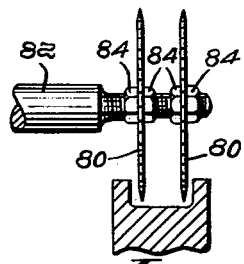
Fig. 10 shows the dual saws used to remove the backbone.

When it is desired to remove the backbone entirely, the arrangement shown in Fig. 10 is employed, using two saws spaced apart the width of the spinal vertebrae. These saws 80 are fixed on the reduced and threaded end of a shaft 82 by nuts 84 with capacity for adjustment of their relative spaced relation, so as to cut through the back of the carcass at both sides of the backbone simultaneously.

Figure 6:
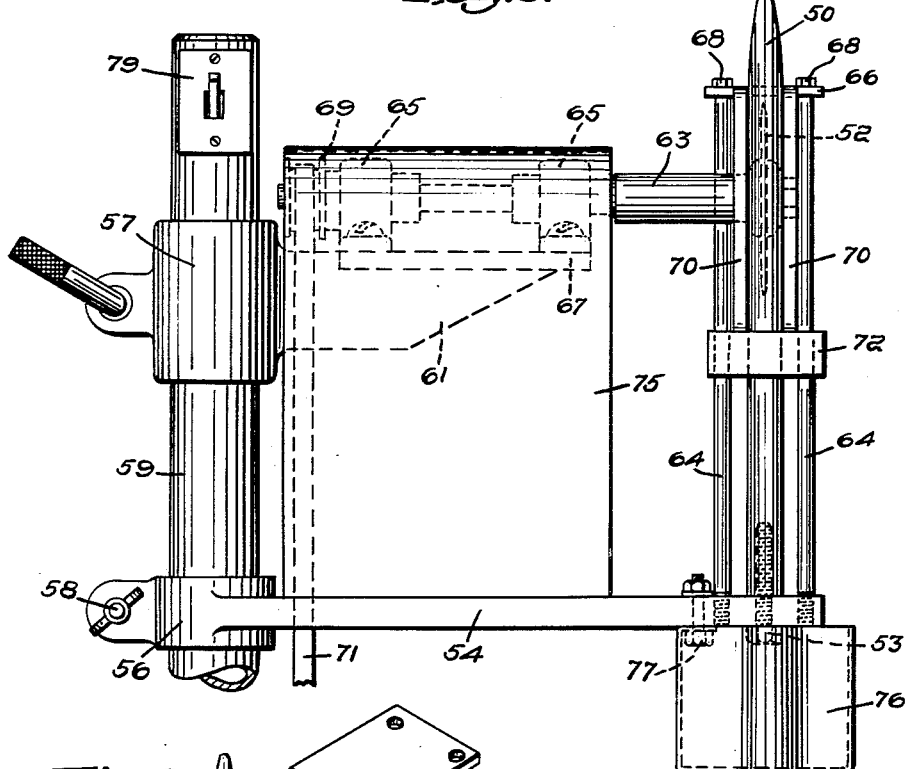
Fig. 6 is a front view of an alternative form of machine, with the drive and pedestal omitted.
Figure 9:
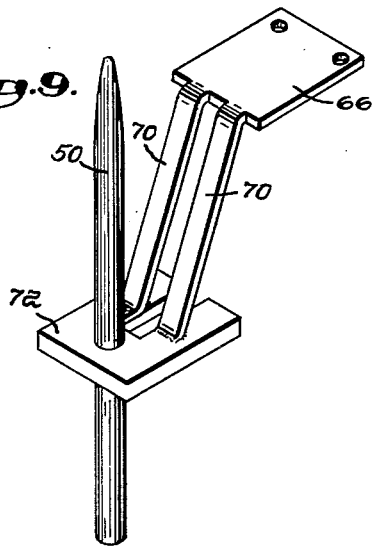
Fig. 9 shows the guide and guards of Figs. 6 to 8.
Figure 8:
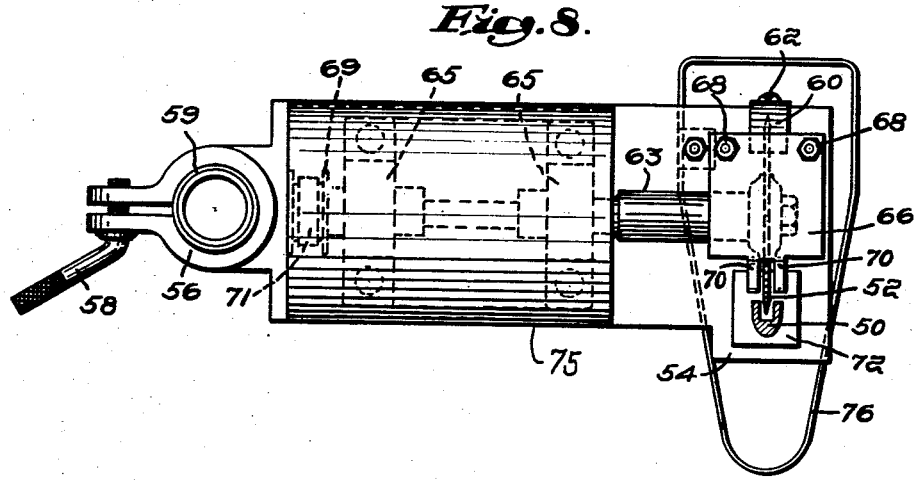
Fig. 8 is a plan view of the machine of Fig. 6, being shown partly in section.
Figure 9:
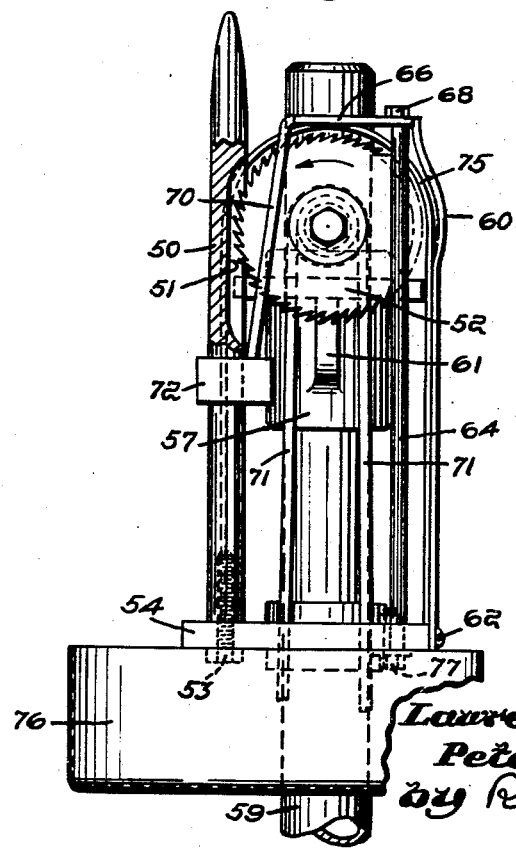

In Figs. 6 to 8 is shown an embodiment of the invention principle, specially adapted for cropping off the heads, necks, wing tips, and feet of dressed poultry and other carcasses. In this form the slotted guide 50 which holds the member up to the saw 52 is vertical, and the neck, wing, or foot is slid down vertically along the guide and past the saw.

The guide 50 with its slot 51 is mounted by an axial screw 53 upon an arm 54 fixed by means of its split collar 56 on the standard 59 by means of clamping screw 58 with capacity for vertical adjustment independently of the arm 61 on collar 57. The mounting of the saw 52 on its shaft 63 running in bearings 65 on the shelf 67 is as already described, the drive through pulley 69 and belt 71 being as before. It will be noted that saw 52 is rotated backwardly, i.e., the teeth rake backward instead of in the conventional forward direction. This has been found desirable by some users, as it lessens the tendency of the saw to snatch the meat or bone in, when aided by gravity in this vertical type of feed.

The guarding of the saw 52 and the arresting of thrown fragments at the rear is effected by a partly curved shield 60 mounted by screw 62 on arm 54, and by two rods 64 threaded into arm 54. A rectangular plate 66 is fixed on the tops of these rods by screws 68 entering these rods, overlying the saw and guarding it from above. From this plate 66 inclined guards 70 integral with the plate 66 extend down on each side of the saw to a heavy rectangular block 72, to which they are welded. This block 72 is welded to slotted guide 50 about halfway up, far enough below the cutting point so that the parts of the carcass will have been completely separated by the saw before reaching the block 72.

In this machine, the switch 79 is shifted to the top of standard 59. A removable cover 75 is preferably provided over the portion of the shaft 63, bearings 65, pulley 69 and upper portion of belt 71, to shield them from flying fragments of meat and bone. This cover is attached to arm 54. Also, a pan 76 is hung by screw 77 from the under side of arm 54 directly below the saw and slotted guide 50 to catch scraps thrown down by the saw.

The carcass of a fowl is held by its legs by one hand, the head, foot, or a wing tip by the other and slid down between the guide 50 and the guards 70, and the saw cuts it off instantaneously.

The two machines work together to perform the whole processing or fabricating of poultry and other small animals. One cuts off the head, feet, and wing tips of the bird following plucking and drawing. The other splits, halves, or quarters the carcass. Thus they perform all the operations needed after plucking and cleaning to put it in condition for sale in cut-up relation.

The front-to-back depth of the machine is materially reduced, so that it can be set close against a wall and out of the way, but yet be completely accessible for use.

While we have illustrated and described certain forms in which the invention may be embodied, we are aware that many modifications may be made therein by any person skilled in the art, without departing from the scope of the invention as expressed in the claims. Therefore we do not wish to be limited to the particular forms shown, or to the details of construction thereof, but What we do claim is:

1. A machine for cutting up eviscerated poultry and other small animals for food, having, in combination, an upright standard, an outwardly extending arm mounted on said standard, bearing means on said arm, a rotatable circular saw journaled in said bearing means, means operatively connected to said saw for rotating said saw, elongated poultry guide means supported on said standard and extending in a plane at right angles to the axis of said saw, said guide means having a slot therein in alignment with said saw to receive the edge of said saw.

2. The combination according to claim 1 in which the guide means extends below the saw in substantially horizontal relation.

3. The combination according to claim 1 in which the guide means extends in substantially vertical relation.

4. The combination according to claim 1 in which guard means is mounted on the arm and overhangs the saw above and at both lateral sides of the saw.

5. The combination according to claim 1 in which a support is mounted on the standard beneath the first arm, and a pan is supported by the support beneath the saw.

6. The combination according to claim 1 in which an arcuate shield is mounted on the arm across the path of particles of the poultry that are thrown rearwardly by the saw.

References Cited in the file of this patent

UNITED STATES PATENTS

| | | |
|---|---|---|
| 2,169,951 | Hannan | Aug. 15, 1939 |
| 2,237,203 | Swanson | Apr. 1, 1941 |
| 2,766,477 | Dahlberg | Oct. 16, 1956 |